US007379068B2

(12) United States Patent
Radke

(10) Patent No.: US 7,379,068 B2
(45) Date of Patent: May 27, 2008

(54) MEMORY SYSTEM AND METHOD FOR IMPROVED UTILIZATION OF READ AND WRITE BANDWIDTH OF A GRAPHICS PROCESSING SYSTEM

(75) Inventor: William Radke, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 355 days.

(21) Appl. No.: 10/928,515

(22) Filed: Aug. 27, 2004

(65) Prior Publication Data

US 2005/0024367 A1 Feb. 3, 2005

Related U.S. Application Data

(63) Continuation of application No. 09/736,861, filed on Dec. 13, 2000, now Pat. No. 6,784,889.

(51) Int. Cl.
*G09G 5/39* (2006.01)
*G06F 13/00* (2006.01)
*G06T 1/20* (2006.01)

(52) U.S. Cl. ....................... 345/531; 345/536; 345/506

(58) Field of Classification Search ................ 345/531, 345/530, 506, 501, 558, 564, 536, 537, 539, 345/540
See application file for complete search history.

(56) References Cited

U.S. PATENT DOCUMENTS 4,882,683 A * 11/1989 Rupp et al. ................. 345/568
5,142,276 A * 8/1992 Moffat ........................ 345/545
5,353,402 A 10/1994 Lau ............................ 395/162
5,809,228 A 9/1998 Langendorf et al. ... 395/185.06
5,831,673 A 11/1998 Przyborski et al. ......... 348/239
5,860,112 A 1/1999 Langendorf et al. ........ 711/143
5,924,117 A 7/1999 Luick ......................... 711/127
5,987,628 A 11/1999 Von Bokern et al. ......... 714/48
6,002,412 A * 12/1999 Schinnerer .................. 345/558
6,112,265 A 8/2000 Harriman et al. ............. 710/40
6,115,837 A 9/2000 Nguyen et al. ............. 714/769
6,150,679 A 11/2000 Reynolds .................... 257/213
6,151,658 A 11/2000 Magro ........................ 711/110
6,167,551 A 12/2000 Nguyen et al. ............. 714/770

(Continued)

*Primary Examiner*—Kee M. Tung
*Assistant Examiner*—Joni Hsu
(74) *Attorney, Agent, or Firm*—Dorsey & Whitney LLP

(57) ABSTRACT

A system and method for processing graphics data which improves utilization of read and write bandwidth of a graphics processing system. The graphics processing system includes an embedded memory array having at least three separate banks of single ported memory in which graphics data are stored in memory page format. A memory controller coupled to the banks of memory writes post-processed data to a first bank of memory concurrently with reading data from a second bank of memory. A synchronous graphics processing pipeline processes the data read from the second bank of memory and provides the post-processed graphics data to the memory controller to be written back to the bank of memory from which the pre-processed data was read. The processing pipeline is capable of concurrently processing an amount of graphics data at least equal to the amount of graphics data included in a page of memory. A third bank of memory is precharged concurrently with writing data to the first bank and reading data from the second bank in preparation for access when reading data from the second bank of memory is completed.

22 Claims, 5 Drawing Sheets

U.S. PATENT DOCUMENTS

| | | | | |
|---|---|---|---|---|
| 6,272,651 | B1 | 8/2001 | Chin et al. | 714/43 |
| 6,279,135 | B1 | 8/2001 | Nguyen et al. | 714/769 |
| 6,366,984 | B1 | 4/2002 | Carmean et al. | 711/141 |
| 6,401,168 | B1 | 6/2002 | Williams et al. | 711/112 |
| 6,424,658 | B1 * | 7/2002 | Mathur | 370/429 |
| 6,470,433 | B1 * | 10/2002 | Prouty et al. | 711/168 |
| 6,523,110 | B1 | 2/2003 | Bright et al. | 712/239 |
| 6,587,112 | B1 * | 7/2003 | Goeltzenleuchter et al. | 345/532 |
| 6,798,420 | B1 * | 9/2004 | Xie | 345/554 |
| 2001/0019331 | A1 | 9/2001 | Nielsen et al. | 345/542 |

* cited by examiner

MEMORY SYSTEM AND METHOD FOR IMPROVED UTILIZATION OF READ AND WRITE BANDWIDTH OF A GRAPHICS PROCESSING SYSTEM

CROSS-REFERENCE TO RELATED APPLICATION

This application is a continuation of U.S. patent application Ser. No. 09/736,861, filed Dec. 13, 2000 now U.S. Pat. No. 6,784,889.

TECHNICAL FIELD

The present invention is related generally to the field of computer graphics, and more particularly, to a graphics processing system and method for use in a computer graphics processing system.

BACKGROUND OF THE INVENTION

Graphics processing systems often include embedded memory to increase the throughput of processed graphics data. Generally, embedded memory is memory that is integrated with the other circuitry of the graphics processing system to form a single device. Including embedded memory in a graphics processing system allows data to be provided to processing circuits, such as the graphics processor, the pixel engine, and the like, with low access times. The proximity of the embedded memory to the graphics processor and its dedicated purpose of storing data related to the processing of graphics information enable data to be moved throughout the graphics processing system quickly. Thus, the processing elements of the graphics processing system may retrieve, process, and provide graphics data quickly and efficiently, increasing the processing throughput.

Processing operations that are often performed on graphics data in a graphics processing system include the steps of reading the data that will be processed from the embedded memory, modifying the retrieved data during processing, and writing the modified data back to the embedded memory. This type of operation is typically referred to as a read-modify-write (RMW) operation. The processing of the retrieved graphics data is often done in a pipeline processing fashion, where the processed output values of the processing pipeline are rewritten to the locations in memory from which the pre-processed data provided to the pipeline was originally retrieved. Examples of RMW operations include blending multiple color values to produce graphics images that are composites of the color values and Z-buffer rendering, a method of rendering only the visible surfaces of three-dimensional graphics images.

In conventional graphics processing systems including embedded memory, the memory is typically a single-ported memory. That is, the embedded memory either has only one data port that is multiplexed between read and write operations, or the embedded memory has separate read and write data ports, but the separate ports cannot be operated simultaneously. Consequently, when performing RMW operations, such as described above, the throughput of processed data is diminished because the single ported embedded memory of the conventional graphics processing system is incapable of both reading graphics data that is to be processed and writing back the modified data simultaneously. In order for the RMW operations to be performed, a write operation is performed following each read operation. Thus, the flow of data, either being read from or written to the embedded memory, is constantly being interrupted. As a result, full utilization of the read and write bandwidth of the graphics processing system is not possible.

One approach to resolving this issue is to design the embedded memory included in a graphics processing system to have dual ports. That is, the embedded memory has both read and write ports that may be operated simultaneously. Having such a design allows for data that has been processed to be written back to the dual ported embedded memory while data to be processed is read. However, providing the circuitry necessary to implement a dual ported embedded memory significantly increases the complexity of the embedded memory and requires additional circuitry to support dual ported operation. As space on an graphics processing system integrated into a single device is at a premium, including the additional circuitry necessary to implement a multi-port embedded memory, such as the one previously described, may not be an reasonable alternative.

Therefore, there is a need for a method and embedded memory system that can utilize the read and write bandwidth of a graphics processing system more efficiently during a read-modify-write processing operation.

SUMMARY OF THE INVENTION

The present invention is directed to a system and method for processing graphics data in a graphics processing system which improves utilization of read and write bandwidth of the graphics processing system. The graphics processing system includes an embedded memory array that has at least three separate banks of memory that stores the graphics data in pages of memory. Each of the memory banks of the embedded memory has separate read and write ports that are inoperable concurrently. The graphics processing system further includes a memory controller coupled to the read and write ports of each bank of memory that is adapted to write post-processed data to a first bank of memory while reading data from a second bank of memory. A synchronous graphics processing pipeline is coupled to the memory controller to process the graphics data read from the second bank of memory and provide the post-processed graphics data to the memory controller to be written to the first bank of memory. The processing pipeline is capable of concurrently processing an amount of graphics data at least equal to the amount of graphics data included in a page of memory. A third bank of memory may be precharged concurrently with writing data to the first bank and reading data from the second bank in preparation for access when reading data from the second bank of memory is completed.

DETAILED DESCRIPTION OF THE INVENTION

Embodiments of the present invention provide a memory system having multiple single-ported banks of embedded memory for uninterrupted read-modify-write (RMW) operations. The multiple banks of memory are interleaved to allow graphics data modified by a processing pipeline to be written to one bank of the embedded memory while reading pre-processed graphics data from another bank. Another bank of memory is precharged during the reading and writing operations in the other memory banks in order for the RMW operation to continue into the precharged bank uninterrupted. The length of the RMW processing pipeline is such that after reading and processing data from a first bank, reading of preprocessed graphics data from a second bank may be performed while writing modified graphics data back to the bank from which the pre-processed data was previously read.

Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
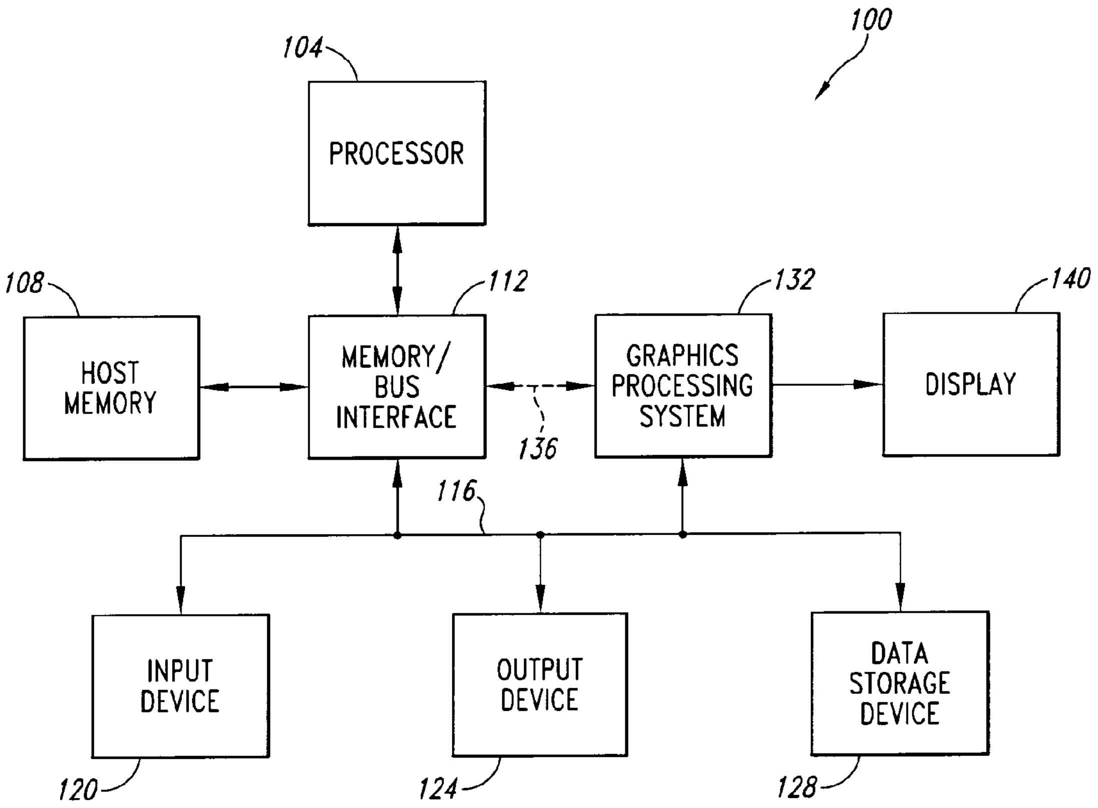
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
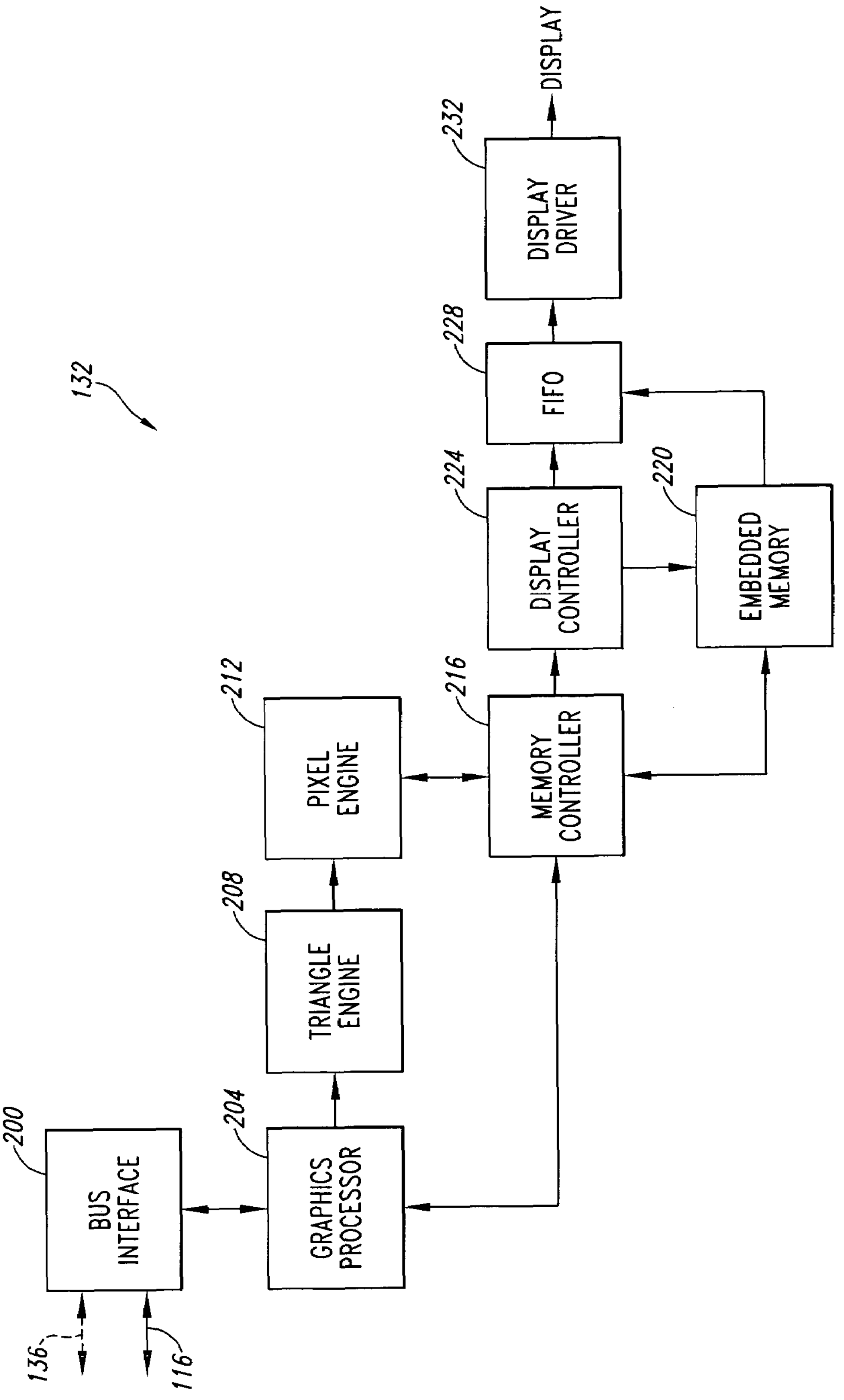
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map. A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from an embedded memory 220. The embedded memory 220 stores graphics data, such as source pixel color values and destination pixel color values. A display controller 224 coupled to the embedded memory 220 and to a first-in first-out (FIFO) buffer 228 controls the transfer of destination color values to the FIFO 228. Destination color values stored in the FIFO 336 are provided to a display driver 232 that includes circuitry to provide digital color signals, or convert digital color signals to red, green, and blue analog color signals, to drive the display 140 (FIG. 1).

Figure 3:
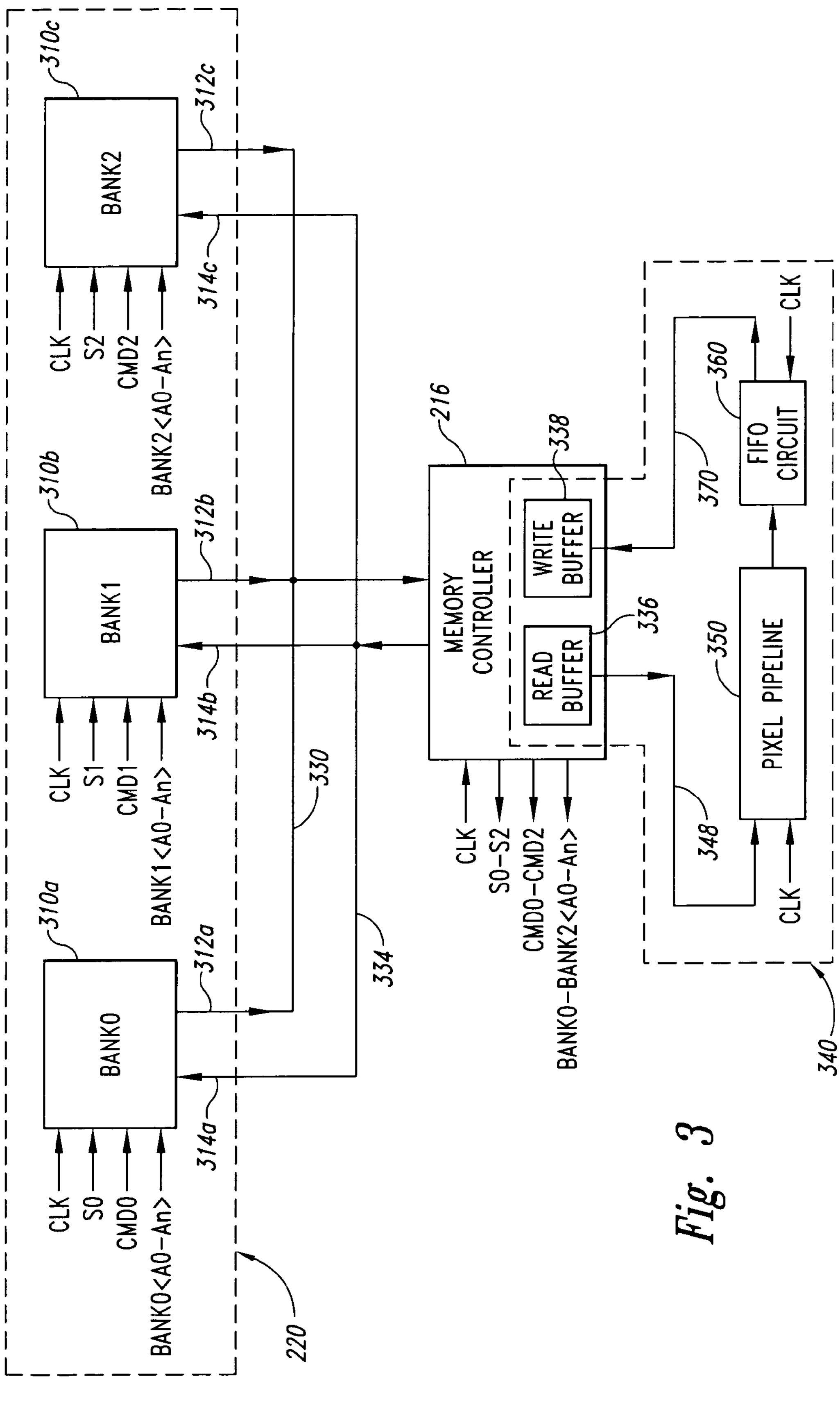
FIG. 3 is a block diagram representing a memory system according to an embodiment of the present invention.

FIG. 3 displays a portion of the memory controller 216, and embedded memory 220 according to an embodiment of the present invention. As illustrated in FIG. 3, included in the embedded memory 220 are three conventional banks of synchronous memory 310*a-c* that each have separate read and write data ports 312*a-c* and 314*a-c*, respectively. Although each bank of memory has individual read and write data ports, the read and write ports cannot be activated simultaneously, as with most conventional synchronous memory. The memory of each memory bank 310*a-c* may be allocated as pages of memory to allow data to be retrieved from and stored in the banks of memory 310*a-c* a page of memory at a time. It will be appreciated that more banks of memory may be included in the embedded memory 220 than what is shown in FIG. 3 without departing from the scope of the present invention. Each bank of memory receives command signals CMD0-CMD2, and address signals Bank0<A0-An>-Bank2<A0-An> from the memory controller 216. The memory controller 216 is coupled to the read and write ports of each of the memory banks 310*a-c* through a read bus 330 and a write bus 334, respectively.

The memory controller is further coupled to provide read data to the input of a pixel pipeline 350 through a data bus 348 and receive write data from the output of a first-in first-out (FIFO) circuit 360 through data bus 370. A read buffer 336 and a write buffer 338 are included in the memory controller 216 to temporarily store data before providing it to the pixel pipeline 350 or to a bank of memory 310*a-c*. The pixel pipeline 350 is a synchronous processing pipeline that includes synchronous processing stages (not shown) that perform various graphics operations, such as lighting calculations, texture application, color value blending, and the like. Data that is provided to the pixel pipeline 350 is processed through the various stages included therein, and finally provided to the FIFO 360. The pixel pipeline 350 and FIFO 360 are conventional in design. Although the read and write buffers 336 and 338 are illustrated in FIG. 3 as being included in the memory controller 216, it will be appreciated that these circuits may be separate from the memory controller 216 and remain within the scope of the present invention.

Generally, the circuitry from where the pre-processed data is input and where the post-processed data is output is collectively referred to as the graphics processing pipeline 340. As shown in FIG. 3, the graphics processing pipeline 340 includes the read buffer 336, data bus 348, the pixel pipeline 350, the FIFO 360, the data bus 370, and the write buffer 338. However, it will be appreciated that the graphics processing pipeline 340 may include more or less than that shown in FIG. 3 without departing from the scope of the present invention.

Moreover, due to the pipeline nature of the read buffer 336, the pixel pipeline 350, the FIFO 360, and the write buffer 338, the graphics processing pipeline 340 can be described as having a "length." The length of the graphics processing pipeline 340 is measured by the maximum quantity of data that may be present in the entire graphics processing pipeline (independent of the bus/data width), or by the number of clock cycles necessary to latch data at the read buffer 336, process the data through the pixel pipeline 350, shift the data through the FIFO 360, and latch the post-processed data at the write buffer 338. As will be explained in more detail below, the FIFO 360 may be used to provide additional length to the overall graphics processing pipeline 340 so that reading graphics data from one of the banks of memory 310*a-c* may be performed while writing modified graphics data back to the bank of memory from which graphics data was previously read.

It will be appreciated that other processing stages and other graphics operations may be included in the pixel pipeline 350, and that implementing such synchronous processing stages and operations is well understood by a person of ordinary skill in the art. It will be further appreciated that a person of ordinary skill in the art would have sufficient knowledge to implement embodiments of the memory system described herein without further details. For example, the provision of the CLK signal, the Bank0<A0-An>-Bank2<A0-An> signals, and the CMD-CMD2 signals to each memory bank 310*a-c* to enable the respective banks of memory to perform various operations, such as precharge, read data, write data, and the like, are well understood. Consequently, a detailed description of the memory banks has been omitted from herein in order to avoid unnecessarily obscuring the present invention.

FIG. 4 illustrates operation of the memory controller 216, the embedded memory 220, the pixel pipeline 350 and FIFO 360 according to an embodiment present invention. As illustrated in FIG. 4, interleaving multiple memory banks of an embedded memory and having a graphics processing pipeline 408 with a data length at least the data length of a page of memory allows for efficient use of the read and write bandwidth of the graphics processing system. It will be appreciated that FIG. 4 is a conceptual representation of various stages during a RMW operation according to embodiments of the present invention and is provided merely by way of example.

Graphics data is stored in the banks of memory 310*a-c* (FIG. 3) in pages of memory as described above. Memory pages 410, 412, and 414 are associated with banks of memory 310*a*, 310*b*, and 310*c*, respectively. Memory page 416 is a second memory page associated with the memory bank 310*a*. The operations of reading, writing, and precharging the banks of memory 310*a-c* are interleaved so that the RMW operation is continuous from commencement to completion. Graphics processing pipeline 408 represents the processing pipeline extending from the read bus 330 to the write bus 334 (FIG. 3), and has a data length as at least the data length for a page of memory. That is, the length of data that is in process through the graphics processing pipeline 408 is at least the same as the amount of data included in a memory page. As a result, as data from the first entry of a memory page in one memory bank is being read, modified data can be written back to the first entry of a memory page in another bank of memory. During the reading and writing to the selected banks of memory, a third bank of memory is precharging to allow the RMW operation to continue uninterrupted. In order for uninterrupted operation, the time to complete precharge and setup operations of the third bank of memory should be less than the time necessary to read an entire page of memory.

Figure 4A:
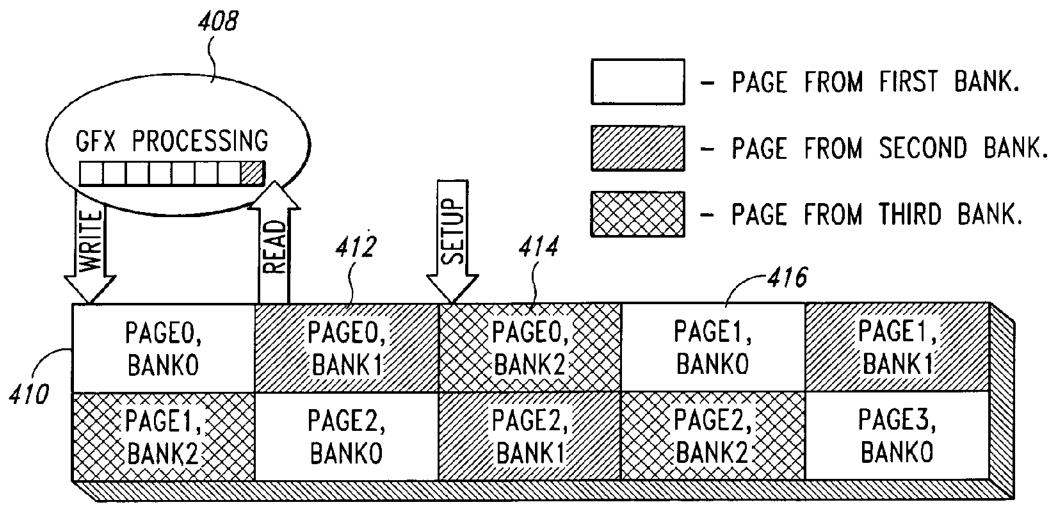
FIG. 4 is a block diagram illustrating operation of the memory system of FIG. 3.

FIG. 4*a* illustrates the stage in the RMW operation where the initial reading of pre-processed data from the first memory page 410 in a first memory bank has been completed, and reading pre-processed data from the first entry from the second memory page 412 in a second memory bank has just begun. The data read from the first entry of the memory page 410 has been processed through the graphics processing pipeline 408 and is now about to be written back to the first entry of memory page 410 to replace the pre-processed data. The memory page 414 of a third memory bank is precharging in preparation for access following the completion of reading pre-processed data from memory page 412.

Figure 4B:
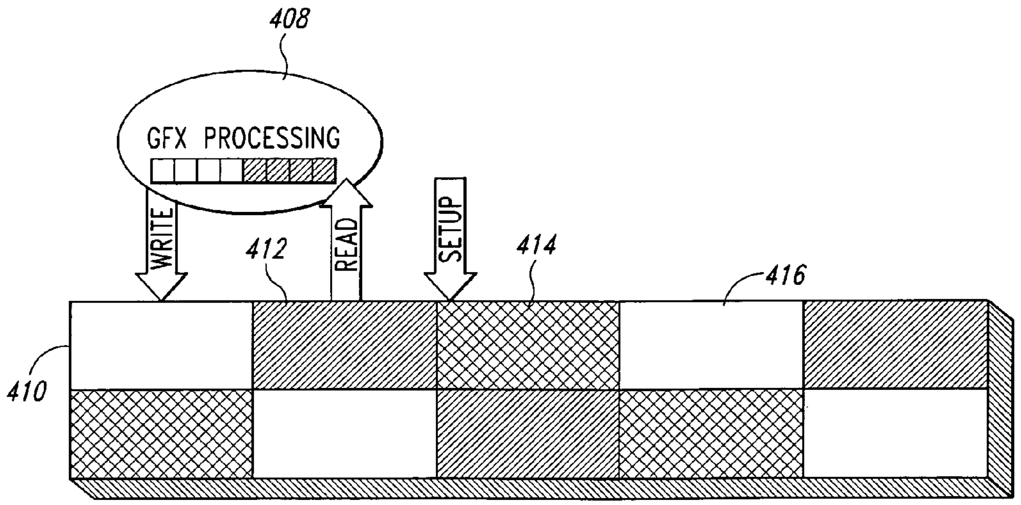
Figure 4C:
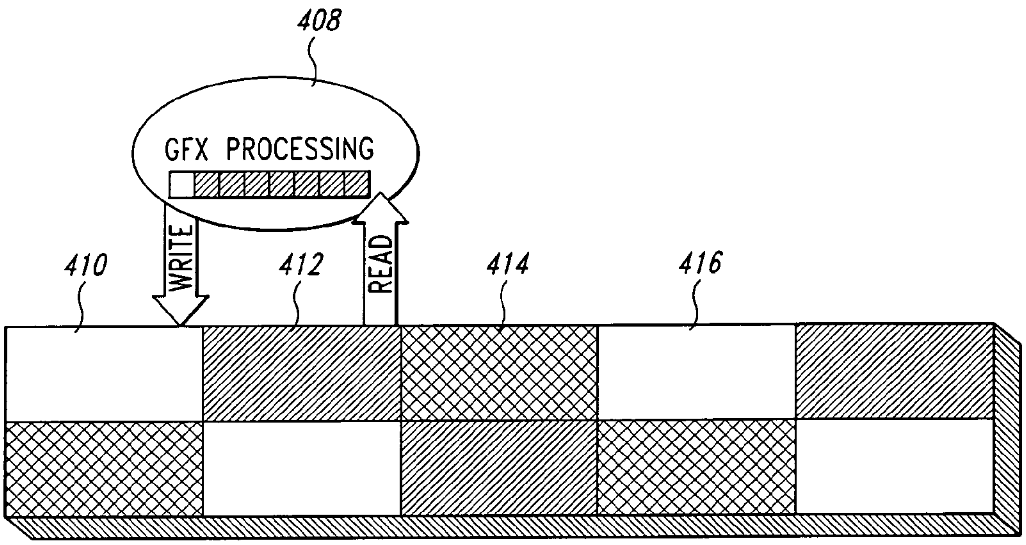
Figure 4D:
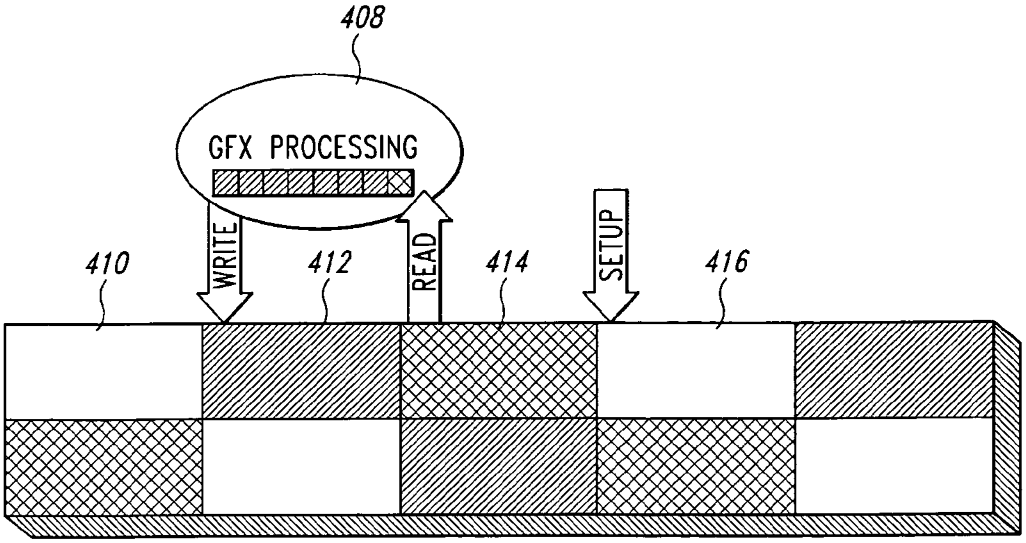

FIG. 4*b* illustrates the stage in the RMW operation where data is in the midst of being read from the second memory page 412 and being written to the first memory page 410. FIG. 4*c* illustrates the stage where the preprocessed data in the last entry of the second memory page 412 is being read, and post-processed data is being written back to the last entry of the first memory page 410. The setup of the memory page 414 has been completed and is ready to be accessed. FIG. 4*d* illustrates the stage in the RMW operation where reading data from the memory page 414 has just begun. Due to the length of the graphics processing pipeline 408, the data from the first entry in the third memory page 414 can be read while writing post-processed data back to the first entry of the second memory page 412. Memory page 416, which is associated with the first memory bank, is precharged in preparation for reading following the completion of reading data from the memory page 414.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory system for a graphics processing system having a graphics processing pipeline for processing pre-processed graphics data to generate post-processed graphics data, the memory system having:

at least three memory banks for storing graphics data, each of the memory banks having command and address terminals and further having data output terminals and data input terminals, each memory bank configured to provide read data at the data output terminals and store write data provided to the input data terminals responsive to command and address signals applied to the command and address terminals;

a read data bus coupled to the output data terminals;

a write data bus coupled to the input data terminals;

a pre-processed data buffer having an input coupled to the read data bus and an output coupled to the graphics processing pipeline, the read buffer configured to temporarily store pre-processed graphics data read from a memory bank and provide the same to the graphics processing pipeline;

a post-processed data buffer having an input coupled to the graphics processing pipeline and further having an output coupled to the write data bus, the post-processed data configured to temporarily store the post-processed graphics data and provide the same to the output to be written to the memory banks; and a memory controller coupled to the command and address terminals of the memory banks, the memory controller configured to generate command and address signals to coordinate reading pre-processed graphics data from a first of the memory banks concurrently with writing post-processed graphics data to a second of the memory banks, the post-processed graphics data written to the same locations in the second of the memory banks from which the corresponding pre-processed graphics data was originally read.

2. The memory system of claim 1 wherein the post-processed data buffer comprises:

a synchronous first-in first-out ("FIFO") buffer having an input coupled to the output of the graphics processing pipeline and further having an output, the FIFO buffer configured to temporarily store the post-processed graphics data from the graphics processing pipeline and provide the same to the output; and a write buffer having an input coupled to the output of the FIFO buffer and further having an output coupled to the write data bus, the write buffer configured to temporarily store the post-processed graphics data prior to writing the same back to a memory location in a memory bank from which the corresponding pre-processed graphics data was originally read.

3. The memory system of claim 1 wherein the at least three memory banks comprise at least three single ported memory banks.

4. The memory system of claim 1 wherein each memory bank comprises an array of memory configured to store graphics data in pages of memory and wherein the pre-processed data buffer and the post-processed data buffer, along with the graphics processing pipeline, have sufficient data capacity to store graphics data from a page of memory.

5. The memory system of claim 1 wherein the at least three memory banks comprises at least three banks of embedded memory.

6. The memory system of claim 1, further comprising a precharge circuit coupled to the banks of memory to precharge a third one of the banks of memory concurrently with the memory controller writing post-processed data from the second one of the banks of memory and reading data from the first one of the banks of memory.

7. A graphics processing system, comprising:

at least three separate banks of memory for storing graphics data in memory pages, each bank of memory having separate read and write ports from which graphics data is read and to which graphics data is provided to be written;

a read data bus coupled to the read ports of the banks of memory;

a write data bus coupled to the write ports of the banks of memory;

a graphics processing pipeline coupled to the read data bus and the write data bus and configured to process graphics data provided on the read data bus and provide processed graphics data to the write data bus, the graphics processing pipeline having a graphics data capacity at least equal to an amount of graphics data of a memory page; and a memory controller coupled to the banks of memory and configured to command a first one of the banks of memory to provide graphics data to the read data bus for processing by the graphics processing pipeline and command a second one of the banks of memory to write the processed graphics data to the same memory locations in the memory page from which the graphics data was read before being processed.

8. The graphics processing system of claim 7, further comprising a precharge circuit coupled to the banks of memory to precharge a third one of the banks of memory concurrently with the memory controller writing post-processed data from the second one of the banks of memory and reading data from the first one of the banks of memory.

9. The graphics processing system of claim 7 wherein the banks of memory comprise embedded synchronous memory.

10. The graphics processing system of claim 7 wherein the graphics processing pipeline comprises:

a pre-processed data buffer coupled to the read data bus and configured to temporarily store the graphics data read from a bank of memory;

a pixel processing pipeline coupled to the pre-processed data buffer and configured to receive and process the graphics data from the pre-processed data buffer and generate processed graphics data; and a post-processed data buffer coupled to the pixel processing pipeline and configured to receive processed graphics data from the pixel processing pipeline and temporarily store the same before being provided to the write data bus.

11. The graphics processing system of claim 10 wherein the post-processed data buffer comprises:

a first-in first-out ("FIFO") buffer having an input coupled to the pixel processing pipeline and further having an output at which the processed data is provided after being temporarily stored; and a write buffer circuit having an input coupled to the FIFO buffer and having an output coupled to the write data bus, the write buffer configured to temporarily store the processed data received from the FIFO prior to being written to a memory bank.

12. A method of reading pre-processed graphics data from memory and writing post-processed graphics data to memory, the method comprising:

reading pre-processed graphics data from a first page of memory;

processing the pre-processed graphics data to generate post-processed graphics data;

buffering the post-processed graphics data to provide sufficient data capacity to read all of the pre-processed graphics data from the first page of memory before writing any post-processed graphics data back to the first page of memory;

reading at least some pre-processed graphics data from a second page of memory before writing any post-processed graphics to the first page of memory; and writing post-processed graphics data back to the first page of memory to the same memory locations from which the corresponding pre-processed graphics data was read.

13. The method of claim 12, further comprising buffering the pre-processed graphics data prior to processing the pre-processed graphics data.

14. The method of claim 12 wherein reading pre-processed graphics data from the first page of memory comprises reading graphics data from a page of memory from a first bank of memory and wherein reading at least some pre-processed graphics data from a second page of memory comprises reading at least some pre-processed graphics data from a page of memory from a second bank of memory.

15. The method of claim 14, further comprising preparing a third bank of memory for reading pre-processed graphics data concurrently with writing post-processed graphics data to the page in the first bank of memory.

16. The method of claim 12 wherein reading pre-processed graphics data, processing the pre-processed graphics data, buffering the post-processed graphics data, reading at least some pre-processed graphics data, and writing post-processed graphics data are performed in accordance with a clock signal.

17. The method of claim 12 wherein reading pre-processed graphics data from a first page of memory comprises reading pre-processed graphics data from a first bank of memory having a read port and a write port that are alternatively operable and reading at least some pre-processed graphics data from a second page of memory comprises reading pre-processed graphics data from a second bank of memory having a read port and a write port that are alternatively operable.

18. A method of processing graphics data, comprising:

processing graphics data retrieved from a page of memory in a first bank of memory to generate processed graphics data;

retrieving graphics data from a page of memory in a second bank of memory;

processing the graphics data retrieved from the page of memory in the second bank of memory to generate processed graphics data; and writing processed graphics data back to the page of memory in the first bank of memory concurrently with processing the graphics data retrieved from the page of memory in the second bank of memory and preparing a third bank of memory for reading concurrently with writing the processed graphics data back to the page of memory in the first bank of memory.

19. The method of claim 18 wherein processing graphics data retrieved from a page of memory in the first bank of memory comprises:

retrieving graphics data from a first bank of single ported memory; and processing the graphics data through a synchronous graphics processing pipeline.

20. The method of claim 19 wherein retrieving graphics data from a page of memory in a second bank of memory comprises retrieving graphics data from a second bank of single ported memory and processing the graphics data comprises processing the graphics data retrieved from the second bank of single ported memory through the synchronous graphics processing pipeline.

21. The method of claim 18, further comprising temporarily storing the processed graphics data prior to writing the processed data back to the first bank of memory.

22. The method of claim 21 wherein temporarily storing the processed graphics data comprises buffering the processed graphics data to provide sufficient time for all of the graphics data from the page of memory in the first bank of memory to be read before writing the processed graphics data back to the page of memory in the first bank.

* * * * *